Sept. 16, 1969    J. W. PFEFFER ET AL    3,467,155
CHAIN SAW TOOTH
Filed Sept. 11, 1967
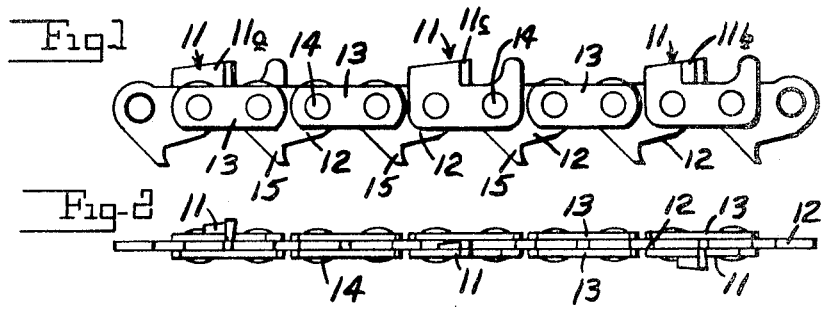
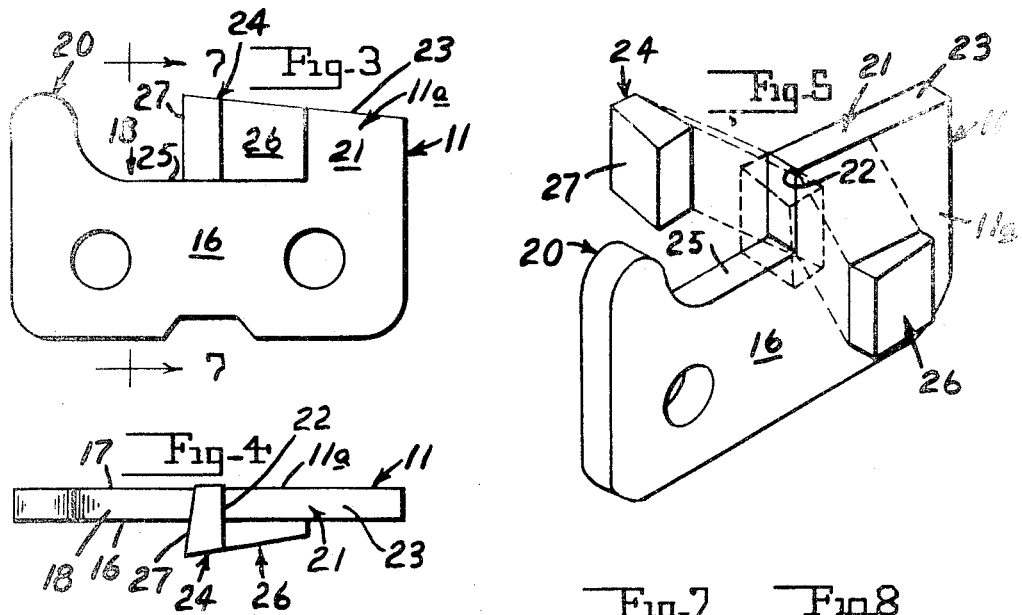
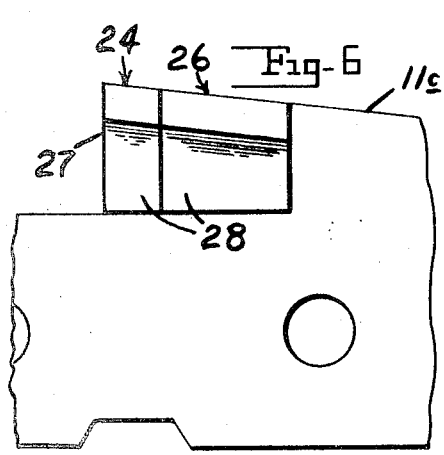
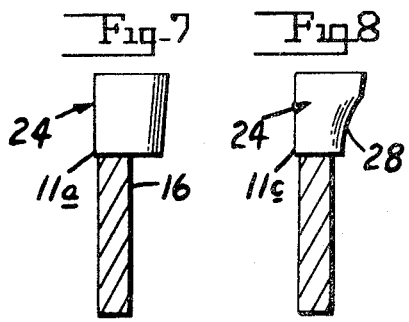
INVENTORS.
JOHN W. PFEFFER
DORSEY L. McKINNEY
BY
ATTYS.

United States Patent Office 3,467,155
Patented Sept. 16, 1969

3,467,155
CHAIN SAW TOOTH
John W. Pfeffer, Spokane, and Dorsey L. McKinney, Everett, Wash., assignors to Washington Chain of Spokane, Inc., Spokane, Wash., a corporation of Washington
Filed Sept. 11, 1967, Ser. No. 666,615
Int. Cl. B27b 33/14
U.S. Cl. 143—135                                6 Claims

ABSTRACT OF THE DISCLOSURE

The device illustrated is a modified cutting link for a conventional chain saw assembly. The cutting link, which replaces more conventional links, includes a cutting tooth insert of hard metal alloy secured across the front of the tooth support portion in the cutter link and projecting to one side thereof. Immediately rearward of the cutting tooth insert is a supporting block of impact-resistant metal alloy having abutting surfaces secured to both the cutter link and to the cutting tooth to form a continuation of the tooth for support of the tooth insert portion that projects laterally beyond the cutting link.

BACKGROUND OF THE INVENTION

It is conventional in chain saws to provide a cutting tooth configuration having a width greater than the thickness of the cutting link on which it is formed or mounted. The most common configuration of such teeth involves the bending of the cutting link to form an offset transverse cutting surface along the top of the link, as demonstrated in U.S. Patent No. 2,508,784. These teeth, while widely used, are difficult to file and to maintain in a sharpened condition.

Various schemes have been proposed in the past to provide hardened tooth inserts on such cutting links. One example is shown in the patent to Pfeffer, 2,974,695, where a relatively thin angular blank 32 of carbide or other hard material is bonded about the cutting surfaces of an L-shaped tooth configuration. Another insert on a bent tooth configuration is shown in the Bullard Patent No. 3,292,675. The Warren Patent 2,651,336 shows a solid insert made of one piece and extending along the side of a flat tooth blank.

The prior development using hardened tooth inserts in a chain saw cutting link each present difficulties from a practical sense. The inserts that are angular require difficult machining operations on the very hard alloys commonly alloys commonly used for such inserts. In addition, the angular configuration increases the difficulty of accurately machining the surface to be bonded to the tooth blank, often resulting in imperfact bonds and resulting tooth failure. The Warren patent disclosure poses a severe difficulty in obtaining plane bonding surfaces on the tooth insert which intersect one another to complement the surfaces of the blank on which they are to be bonded. Inside corners of this type cannot be accurately formed by conventional machining procedures, and a weak bond configuration at the inside corner of the tooth blank is inevitable.

To solve these difficulties while providing a structurally sound hardened tooth insert on a cutting link, we have developed a tooth configuration using a solid tooth insert of very hard material such as tungsten carbide alloys. The tooth insert is backed by a supporting block secured to both the tooth insert and the sides of the cutting link blank so as to provide structural support for the protruding portion of the tooth insert. This permits accurate machining of the bonded surfaces, which in this instance are entirely planar. The present structure eliminates the machining of any corner surface configurations. In this manner, the mating surfaces that are bonded to one another can be accurately machined for maximum surface contact and the strength of the resulting bond is far superior to that obtainable in more complex tooth configurations.

SUMMARY AND OBJECTS OF INVENTION

The device disclosed basically comprises a cutting link for a conventional chain saw apparatus wherein the link is a flat upright plate of constant thickness. The plate is notched to provide a conventional depth gauge at the front of the tooth and to define the rear tooth support portion, which includes an upright plane surface. Bonded to this surface, and also to the base of the notch, is a tooth insert of increased thickness adapted to cut a saw kerf across a portion of the total kerf formed by the combination of teeth on both sides of the chain unit.

The tooth insert has a plane back surface, a portion of which protrudes to one side of the cutting link plate. This protruding portion of the back surface of the tooth is abutted by a solid block of impact-resistant alloy that serves as a continuation of the tooth insert for structural purposes. By utilizing a two piece insert structure, we are able to combine the desired hardness of the forward tooth insert with the impact resistant qualities of the supporting block, whereby the two provide both cutting and shock resistant qualities superior to those obtained by use of a single tooth insert of homogeneous material. In addition, the use of continuous plane abutting surfaces eliminates the difficulties inherent in attempting to machine hard alloys in any corner configuration. Bonding of plane surfaces in this manner assures constant bond strength across the bonded surfaces and minimizes the possibility of failure along these planes.

It is a first object of this invention to provide an economical saw tooth for a chain saw wherein the tooth includes a hardened forward cutting tooth insert and a shock resisting supporting block behind protruding portions of the tooth insert that extend to the side of the plate on which it is mounted.

Another object of the invention is to provide a tooth insert configuration using hardened alloys, wherein the configuration of the tooth insert is such as to facilitate machining operations on such alloys. Another object of the invention is to make a unique combination of cutting and shock resistance qualities in a resulting solid tooth structure.

These and further objects will be evident from the following disclosure, taken together with the accompanying drawings which illustrate a preferred form of the invention. It is to be understood that this form of the invention is only exemplary, and that modifications might be made in specific details without deviating from the scope of this disclosure.

In the drawings:
FIG. 1 is a side elevation view of a portion of a saw chain including cutting links made according to this disclosure;
FIG. 2 is a top view of FIG. 1;
FIG. 3 is an enlarged side elevation view of a single cutting link;
FIG. 4 is a top view of FIG. 3;
FIG. 5 is an exploded perspective view of the cutting link shown in FIG. 3;
FIG. 6 is a side view similar to FIG. 3 showing a center tooth;
FIG. 7 is a sectional view taken along line 7—7 in FIG. 3; and
FIG. 8 is a view similar to FIG. 7, showing the center tooth as seen along line 8—8 in FIG. 1.

PREFERRED EMBODIMENT OF THE INVENTION

The tooth described herein is adapted to be utilized on a conventional chain of a powered chain saw. Such a chain 10 as shown in FIGS. 1 and 2 is made up of a continuous row of repeating sequences of teeth and links. Each sequence includes a cutting link 11 on one side of the chain, a connecting center link 12 and spaced side links 13. The links 11, 12 and 13 are pivotally joined in the conventional manner by rivets 14. The center links 12 have inwardly projecting lugs 15 relative to the chain 10. Lugs 15 fit between teeth in the drive sprocket around the cutter bar of the chain saw (not shown).

As shown in FIG. 1, there is full sequence of cutting members including a first side cutting link 11a, an opposite side cutting link 11b and a center cutting link 11c. The links 11a and 11b are mirror images of one another, while the link 11c is slightly modified in that the tooth insert is undercut along its projecting side for chip clearance.

Each cutting link 11 is formed basically as seen in FIGS. 3 through 8. It includes an upright plate having parallel side surfaces 16, 17 separated from one another by a constant width. The cutting link 11 is formed with an outwardly open notch 18 along its upper edge defining a forward depth gauge 20 and a rearward tooth support 21. The upper end of depth gauge 20 terminates short of the elevation of the upper edge of tooth support 21 and functions in the normal manner to ride against the saw kerf and limit the depth of cut made by the tooth structure immediately behind it. The depth gauges 20 also prevent the individual cutting links 11 from cocking rearward in response to the force applied to the cutting surfaces as they engage the word fibers.

In the cutting link structure illustrated, the front edge 22 of tooth support 21 is an upright plane surface. The upper surface 23 of the tooth support 21 recedes downwardly and rearwardly to provide clearance along the upper portion of the cutting link 11. Mounted across the edge 22 is a cutting tooth insert 24 that has a width slightly greater than twice that of the tooth support 21 on which it is mounted. It is positioned so as to extend substantially beyond one side 16 of the cutting link 11, although there is provided a slight extension of the tooth insert 24 beyond the opposite side surface 17 for clearance purposes (FIG. 4). The tooth insert 24 is bonded to the rear edge 22 and to the bottom edge 25 of the notch 18. The surfaces of the tooth insert 24 are each planar and are complementary to the surfaces 22 and 25 abutted respectively by them.

Located immediately rearward of tooth insert 24 is a support block 26. The block 26 is formed as a continuous extension of tooth insert 24 and has a front edge bonded to the protruding rear edge portion of the tooth insert 24, as well as an inwardly facing surface bonded to the abutted portion of the side surface 16 on the tooth support 21.

The surfaces of the tooth insert 24 and block 26 are tapered so as to diminish in width in a rearward direction. The front cutting surface 27 of tooth insert 24 recedes inwardly a slight amount toward the center line of the chain 10. The upper surfaces of the tooth insert 24 and block 26 are coplanar with the rearwardly receding upper surface 23 of the tooth support 21. These relationships provide adequate clearance for movement of the chisel type tooth through wood being cut thereby.

The structure of the center cutting link 11c is identical to that just described except that both the tooth insert 24 and block 26 are relieved at 28 below the upper cutting edges to provide clearance for sawdust and chips along the center of the kerf formed by chain 10. The center cutting link 11c overlaps the cutting path of the cutter link 11a immediately preceding it in chain 10, and serves to remove the central portion of the wood aligned with the center links 12 of the chain 10.

The advantage of forming the tooth insert 24 and block 26 as described lies in the more accurate placement of the hardened tooth insert 24 and more substantial support of its cutting surfaces, which are subjected to repetitious shock loading during use of the chain. Were the angular tooth configuration made of one piece, it would be necessary to machine an interior right angle at the rear of the tooth to fit against the respective surfaces of the tooth support. This is impractical, since a perfect angular configuration cannot be machined and the resulting bond between the metal to metal surface would not be uniform. Teeth made in such a manner are subject to failure during use and the expected life of such a tooth does not justify the expense involved in its fabrication. However, by using two separate pieces to form the tooth surfaces, we have been able to use machining practices capable of forming plane surfaces completely across the blocks, and these plane surfaces can be bonded to one another with full strength bonding across the entire faces thereof.

The tooth insert 24 is preferably made of a hard alloy of tungsten carbide, of the type commonly used for long wearing abrasive or cutting elements. The block 26 is preferably also made of tungsten carbide, preferably an alloy having high impact resistance. It might be fabricated from any suitable high impact alloy which can be properly bonded as required. The tooth insert 24 and block 26 are bonded to one another and to the tooth support 21 by brazing or soldering processes, the bonding being conventional.

We have found that the construction described herein provides a long-lasting carbide tipped cutting tooth for a chain saw which tooth can be repeatedly subjected to common shock loads without danger of breaking the rather brittle tooth structure. The tooth configuration combines the hard cutting action of superior tungsten alloys with the resistance to impact loading provided by the abutting block 26 that supports the protruding portions of the tooth insert 24. The combination is superior to a simple tooth insert of carbide and can be expected to maintain its cutting surfaces in proper condition for use for a period of time greater than cutting teeth conventionally available today.

Slight modification might be made in the appearance of the tooth without deviating from the basic concept of the two piece bonded insert described herein. For this reason, only the following claims are intended to limit the scope of our disclosed invention.

Having thus described our invention, we claim:

1. In a cutter link for a chain saw wherein the cutter link is formed as an upright plate having parallel side surfaces separated by a constant width and having an outwardly open notch formed therethrough defining a forward depth gauge and a rearward tooth support spaced from one another by the notch base:

a cutting tooth insert of hard metal alloy secured across the front edge of the tooth support, the width of said tooth being greater than the width of the cutter link plate, said tooth insert being laterally offset on said tooth support so as to position a portion of said tooth insert in a location projecting laterally beyond a first side surface of said tooth support;

and a block of impact resistant metal alloy located rearwardly adjacent to the laterally projecting portion of said tooth insert as a rearward continuation thereof, said block being in abutment with and joined to said first side surface of said tooth support and the rear surface of said tooth insert respectively.

2. The apparatus as defined in claim 1 wherein the rear surface of said tooth insert, when mounted on said tooth support, is parallel to the front surface of the tooth support.

3. The apparatus as defined in claim 1 wherein the side surfaces of said tooth insert and block outward of said first side surface of said tooth support are co-planar.

4. The apparatus as defined in claim 1 wherein the side surfaces of said tooth insert and block outward of said first side surface of said tooth support are co-planar; and wherein the total lateral thickness of the assembly comprising the tooth insert, block and tooth support diminishes rearwardly.

5. The apparatus as defined in claim 1 wherein the tooth insert and block are each formed of tungsten carbide alloys.

6. The apparatus as defined in claim 1 wherein the tooth insert is also secured to the base of the notch formed in the cutter link plate.

References Cited

UNITED STATES PATENTS

| | | | |
|---|---|---|---|
| 2,651,336 | 9/1953 | Warren | 143—135 |
| 2,744,548 | 5/1956 | Stephenson et al. | |
| 2,974,695 | 3/1961 | Pfeffer | 143—135 X |
| 3,292,675 | 12/1966 | Bullard. | |
| 3,360,022 | 12/1967 | Stihl | 143—135 |

DONALD R. SCHRAN, Primary Examiner

U.S. Cl. X.R.

29—95; 143—141